US012600125B2

(12) United States Patent
Moriya et al.

(10) Patent No.: US 12,600,125 B2
(45) Date of Patent: Apr. 14, 2026

(54) LIQUID EJECTION APPARATUS AND LIQUID EJECTION CONTROL METHOD

(71) Applicant: CANON KABUSHIKI KAISHA, Tokyo (JP)

(72) Inventors: Takatsugu Moriya, Tokyo (JP); Keiji Tomizawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 204 days.

(21) Appl. No.: 18/491,959

(22) Filed: Oct. 23, 2023

(65) Prior Publication Data

US 2024/0190129 A1 Jun. 13, 2024

(30) Foreign Application Priority Data

Dec. 7, 2022 (JP) ................................ 2022-195900

(51) Int. Cl.

*B41J 2/045* (2006.01)
*B41J 2/14* (2006.01)
*B41J 2/175* (2006.01)
*B41J 2/18* (2006.01)

(52) U.S. Cl.

CPC ......... *B41J 2/0458* (2013.01); *B41J 2/14032* (2013.01); *B41J 2/175* (2013.01)

(58) Field of Classification Search

CPC ........ B41J 2/18; B41J 2/0458; B41J 2/14032; B41J 2/175

See application file for complete search history.

(56) References Cited

U.S. PATENT DOCUMENTS

| | | | |
|---|---|---|---|
| 7,556,330 B2 | 7/2009 | Saito | |
| 7,695,088 B2 | 4/2010 | Yamane | |
| 8,287,091 B2 | 10/2012 | Kyoshima | |
| 8,342,631 B2 | 1/2013 | Kyoshima | |
| 8,985,721 B2 | 3/2015 | Tomizawa | |
| 9,266,325 B2 | 2/2016 | Tomizawa | |
| 9,975,347 B2 | 5/2018 | Tozuka | |
| 10,308,018 B2 | 6/2019 | Miura | |
| 10,457,062 B2 | 10/2019 | Okushima | |
| 2017/0197430 A1* | 7/2017 | Tozuka | B41J 2/17563 |
| 2017/0197437 A1 | 7/2017 | Okushima | |

(Continued)

FOREIGN PATENT DOCUMENTS

JP 2017-124607 A 7/2017

*Primary Examiner* — Jason S Uhlenhake

(74) *Attorney, Agent, or Firm* — Venable LLP

(57) ABSTRACT

In a liquid ejection apparatus, density unevenness of initial ejection from ejection openings after ejection stop can be reduced in a region in which printing is performed by relative movement of an ejection head. The liquid ejection apparatus includes: an ejection head including ejection openings, pressure chambers communicating with the ejection openings, and a flow path communicating with each pressure chamber; a generation mechanism configured to generate liquid flow passing through each pressure chamber via the flow path and differentiate first and second directions of liquid flow for each ejection opening; a scanning mechanism configured to scan the ejection head in the first and second directions; and a control unit configured to perform printing by causing the scanning mechanism to scan the ejection head relative to a printing medium and ejecting liquid from the ejection openings of the first and second directions to a unit region.

11 Claims, 8 Drawing Sheets

(56) References Cited

U.S. PATENT DOCUMENTS

| | | | | |
|---|---|---|---|---|
| 2019/0001672 | A1* | 1/2019 | Hammura | B41J 2/1404 |
| 2023/0007995 | A1 | 1/2023 | Hamada | |
| 2023/0008821 | A1 | 1/2023 | Hamada | |
| 2023/0070795 | A1 | 3/2023 | Tomizawa | |
| 2023/0103488 | A1 | 4/2023 | Aizawa | |

* cited by examiner

LIQUID EJECTION APPARATUS AND LIQUID EJECTION CONTROL METHOD

BACKGROUND OF THE INVENTION

Field of the Invention

The present disclosure relates to a liquid ejection apparatus and a liquid ejection control method and particularly relates to liquid ejection control using an ejection head configured to generate liquid flow at an ejection pressure generation part of an ejection opening for ejecting liquid such as ink.

Description of the Related Art

Technologies of generating ink flow at an ejection pressure generation part of an ejection opening and removing ink thickened in the vicinity of the ejection opening from the vicinity of the ejection opening to maintain favorable ink ejection have been known. Japanese Patent Laid-Open No. 2017-124607 discloses that the moving direction of an ejection head relative to a printing medium is determined in accordance with a flow mode that occurs in the vicinity of an opening by ink flow thus generated. Specifically, landing position shift of ejected ink at initial ejection, which is attributable to thickened ink at an ejection opening from which ejection is not performed for a relatively long duration, varies under influence of both the flow mode, in other words, the direction of ink flow, and the relative moving direction of the ejection head. Thus, according to the patent literature, the landing position shift corresponding to the direction of ink flow can be compensated by appropriately setting the relative moving direction of the ejection head, thereby reducing density unevenness.

However, with the technology disclosed in Japanese Patent Laid-Open No. 2017-124607, the relation between the direction of ink flow at the ejection pressure generation part and the relative moving direction of the ejection head is fixed, and thus even slight landing position shift is potentially recognized as density unevenness in the entire region in which printing is performed by relative movement.

SUMMARY OF THE INVENTION

The present disclosure is intended to provide a liquid ejection apparatus and a liquid ejection control method with which density unevenness of initial ejection from ejection openings after ejection stop can be reduced in a region in which printing is performed by relative movement of an ejection head.

Further features of the present invention will become apparent from the following description of exemplary embodiments with reference to the attached drawings.

DESCRIPTION OF THE EMBODIMENTS

Embodiments of the present disclosure will be described in detail below with reference to the accompanying drawings. The following description will be made on a printing apparatus of an ink jet printing scheme as an exemplary liquid ejection apparatus. The printing apparatus may be, for example, a printer having only a printing function or a multifunction printer having a plurality of functions such as a printing function, a FAX function, and a scanner function. Alternatively, the printing apparatus may be a manufacturing apparatus for manufacturing a color filter, an electronic device, an optical device, a minute structure, or the like by a predetermined printing scheme.

In the following description, "printing" is not limited to formation of meaningful information such as characters and figures but widely includes printing of some information by adhering ink onto a printing medium. Moreover, such information may be or not that actualized to be visually perceptible by a human being. A "printing medium" means not only paper used by a typical printing apparatus but also cloth, a plastic film, a metal plate, glass, ceramics, resin, wood, leather, and the like, which can receive ink. In addition, "ink" should be widely interpreted like the above-described definition of "printing". Thus, ink includes liquid that is applied on a printing medium and can be used for formation of image, design, pattern, or the like, fabrication of the printing medium, or ink processing (for example, solidification or insolubilization of a coloring material in ink applied on a printing medium). Unless otherwise stated, a "print element" (also referred to as an "ejection opening") collectively means an ejection opening or a liquid path communicating with the ejection opening, and an element configured to generate energy used for ink ejection. Hereinafter, a print element substrate for a printing head does not mean a simple base made of a silicon semiconductor but means a configuration provided with elements, wires, and the like.

(Ink Jet Printing Apparatus)

Figure 1A:
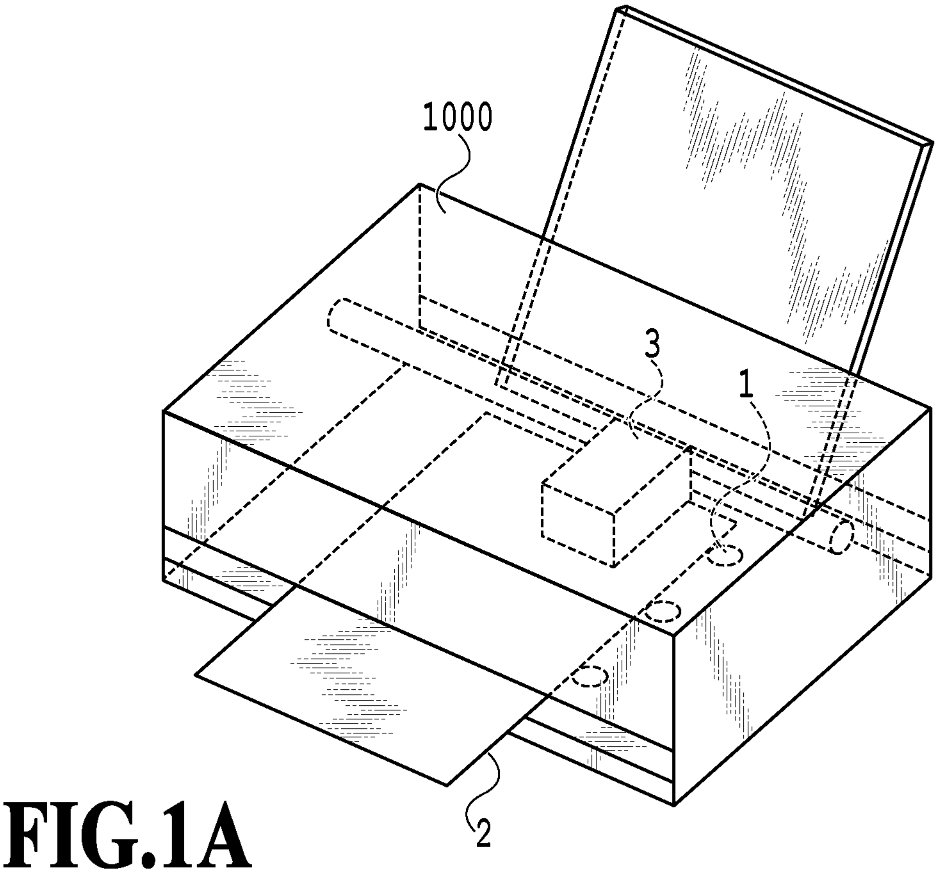
FIGS. 1A and 1B are diagrams for description of an ink jet printing apparatus according to an embodiment of the present disclosure.
Figure 1B:
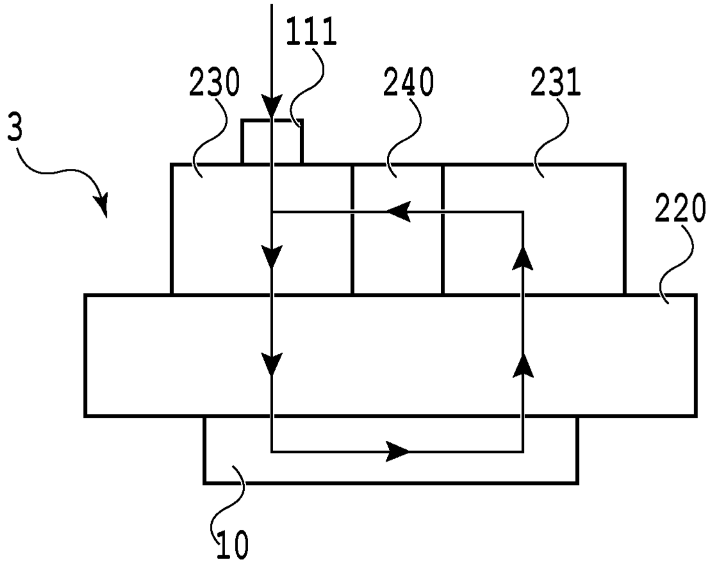

FIGS. 1A and 1B are diagrams for description of an ink jet printing apparatus according to an embodiment of the present disclosure. FIG. 1A is a perspective view schematically illustrating a schematic configuration of the printing apparatus. FIG. 1B is a diagram for description of ink circulation at a liquid ejection head, in particular.

As illustrated in FIG. 1A, a printing apparatus 1000 includes a conveyance mechanism 1 configured to convey a printing medium 2, and a head unit 3 configured to scan (relatively move) in a direction substantially orthogonal to a conveyance direction of the printing medium 2. The printing apparatus 1000 performs printing on the printing medium by repeating scanning of the head unit 3 relative to the printing medium 2 and conveyance of the printing medium 2 by a distance corresponding to a region printed through the scanning. The printing medium 2 is, for example, a cut sheet, but is not limited thereto and may be a long paper roll that is continuous in the conveyance direction.

In FIG. 1B, the head unit 3 includes a print element substrate 10 (ejection head unit) having a configuration for ejecting ink in respective colors of cyan (C), magenta (M), yellow (Y), and black (K). The head unit 3 includes an upstream negative pressure control unit 230 and a downstream negative pressure control unit 231. These units control the pressure of an ink flow path reaching each ejection opening of the print element substrate 10 and generate circulation flow (ink flow) at an ejection pressure generation part (pressure chamber) of the print element substrate 10 in accordance with the difference among values to which the respective units control the pressure. Specifically, a liquid connection unit 111 that is an ink supply port to the upstream negative pressure control unit 230 is provided. The head unit 3 is fluidically connected to a liquid supply unit (not illustrated) and a main tank (not illustrated) through the liquid connection unit 111, the liquid supply unit being configured to perform supply to the head unit 3. The upstream negative pressure control unit 230 fluidically communicates with a liquid supply unit 220 and supplies ink to the print element substrate 10. Part of ink having passed through an ink flow path extending through the pressure chamber of the print element substrate 10 is ejected from corresponding ejection openings, and ink that is not thus ejected reaches to the downstream negative pressure control unit 231 through an ejection flow path of the liquid supply unit 220 again. The head unit 3 also includes a pump 240 configured to return ink from the downstream negative pressure control unit 231 to the upstream negative pressure control unit 230. With the above-described configuration, ink flow illustrated with arrows in FIG. 1B is generated.

(Structure of Print Element Substrate)

Figure 2A:
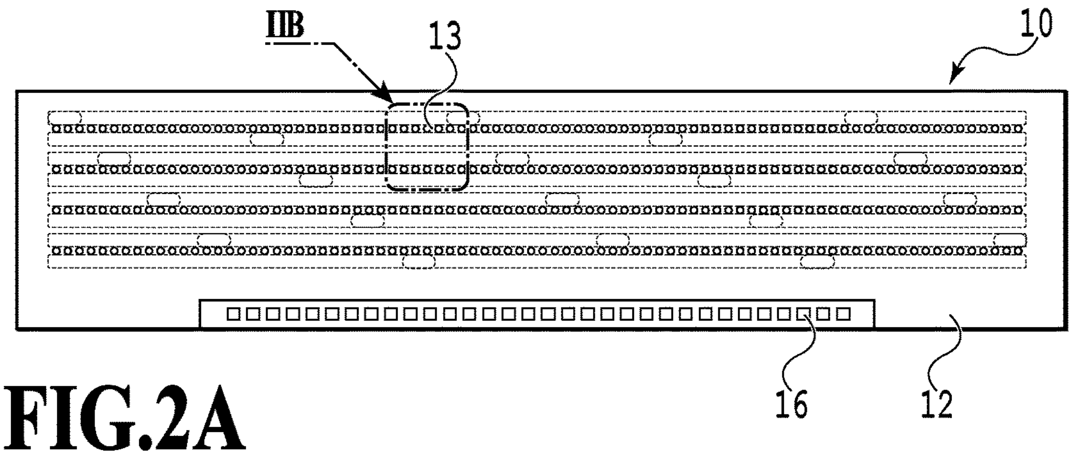
FIGS. 2A to 2C are diagrams for description of a basic configuration of a print element substrate 10 according to the embodiment of the present disclosure.
Figure 2B:
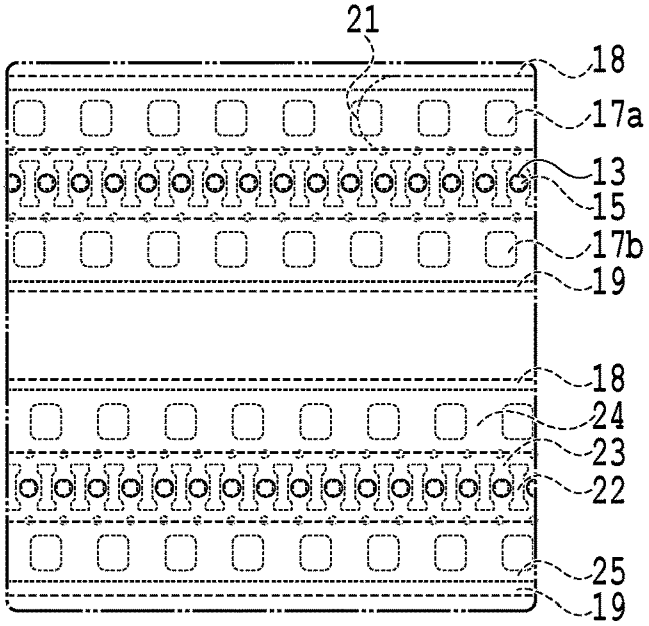
Figure 2C:
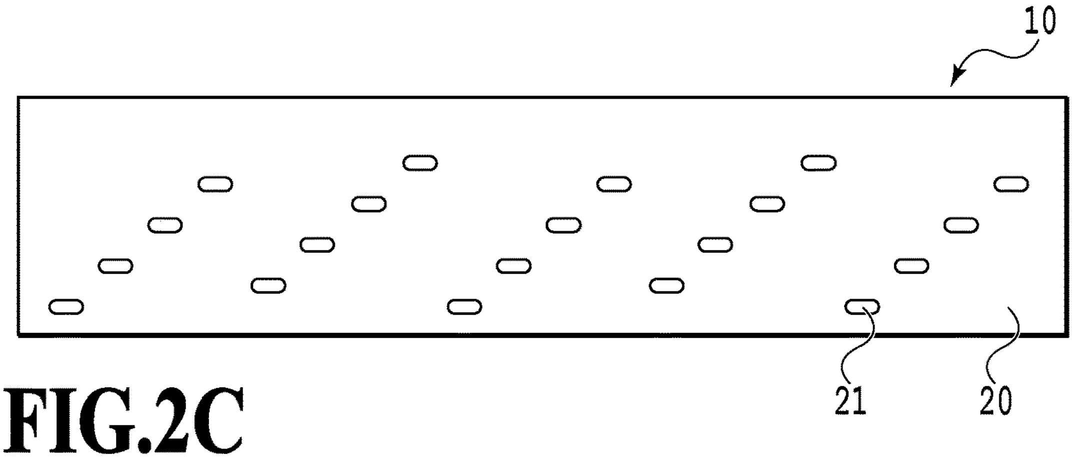

FIGS. 2A to 2C are diagrams for description of a basic configuration of the print element substrate 10 according to the present embodiment. The print element substrate 10 includes a substrate 11 (refer to FIG. 3C), an ejection opening formation member 12, and a lid member 20. The lid member 20 is positioned on a side opposite the ejection opening formation member 12 with respect to the substrate 11. FIG. 2A illustrates a plan view of a surface of the print element substrate 10 on a side where ejection openings 13 are formed, FIG. 2B illustrates an enlarged view of a part denoted by IIb in FIG. 2A, and FIG. 2C illustrates a plan view of the back of FIG. 2A.

As illustrated in FIG. 2A, as an example, four arrays of the ejection openings 13 are formed at the ejection opening formation member 12 of the print element substrate 10. In the following description, a direction in which each ejection opening array of a plurality of ejection openings 13 extends is referred to as an "ejection opening array direction". As illustrated in FIG. 2B, a heater 15 that is a heat generation element for foaming ink with thermal energy is disposed at a position corresponding to each ejection opening 13. A pressure chamber 23 in which the heaters 15 are provided is partitioned by partitions 22. Each heater 15 is electrically connected to a terminal 16 in FIG. 2A through an electric wire (not illustrated) provided at the print element substrate 10. The heaters 15 generate heat and foam air bubbles in ink based on pulse signals input from a control circuit of the printing apparatus 1000 through an electric wiring substrate (not illustrated) and a flexible wiring substrate (not illustrated). The ink is ejected from the ejection openings 13 by foaming force of the air bubbles. As illustrated in FIG. 2B, a liquid supply path 18 and a liquid collection path 19 extend along each ejection opening array and communicate with the pressure chamber 23 through supply ports 17*a* and collection ports 17*b*. The above-described example is of the scheme of ejecting ink with the pressure of air bubbles generated through heating by heaters, but application of the present disclosure is not limited to this aspect. For example, the present disclosure is also applicable to the scheme of generating distortion by using a piezo element or the like and applying the pressure thereof to ink. Thus, the pressure chamber is a chamber that applies pressure for ejection to ink.

As illustrated in FIG. 2C, the lid member 20 in a sheet shape is stacked on the back of the surface of the print element substrate 10 where the ejection openings 13 are formed. The lid member 20 is provided with a plurality of openings 21 communicating with the liquid supply paths 18 and the liquid collection paths 19. In the present embodiment, the lid member 20 is provided with three openings 21 for each liquid supply path 18 and two openings 21 for each liquid collection path 19. The lid member 20 functions as a lid that constitutes part of walls of the liquid supply paths 18 and the liquid collection paths 19 formed in the substrate 11 of the print element substrate 10. The lid member 20 preferably has sufficient corrosion resistance for ink. Moreover, high accuracy is required for the shapes and positions of the openings 21 from a viewpoint of color mixture prevention. Thus, the lid member 20 is preferably made of a light-sensitive resin material or a silicon plate and provided with the openings 21 through a photolithography process. Such a lid member preferably has a small thickness with a pressure loss taken into consideration and is preferably formed of a film member.

As for ink flow in the print element substrate 10, ink is supplied from a common supply flow path (not illustrated) in the liquid supply unit 220 to the liquid supply paths 18 through the openings 21 of the lid member 20. Then, the ink flows from the liquid supply paths 18 to the supply ports 17*a*, a supply-side common liquid chamber 25 in the ejection opening formation member 12, and the pressure chamber 23. Part of the ink is ejected from the ejection openings 13 in the pressure chamber 23, and the ink that is not ejected flows to a collection-side common liquid chamber 26, the collection ports 17*b*, and the liquid collection paths 19. The ink in the liquid collection paths 19 is collected to a common collection flow path (not illustrated) in the liquid supply unit 220 through the openings 21 of the lid member 20.

The above-described basic configuration of the head unit 3 is applicable as a configuration in each of first to third embodiments described below.

First Embodiment

Figure 3A:
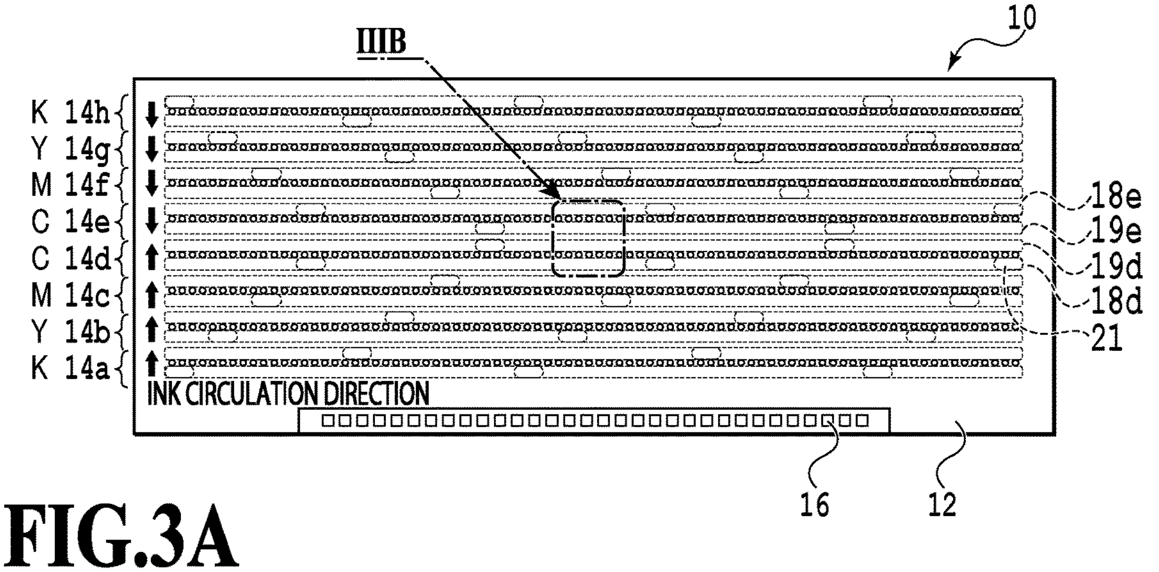
FIGS. 3A to 3C are diagrams illustrating the configuration of a print element substrate according to a first embodiment of the present disclosure.
Figure 3B:
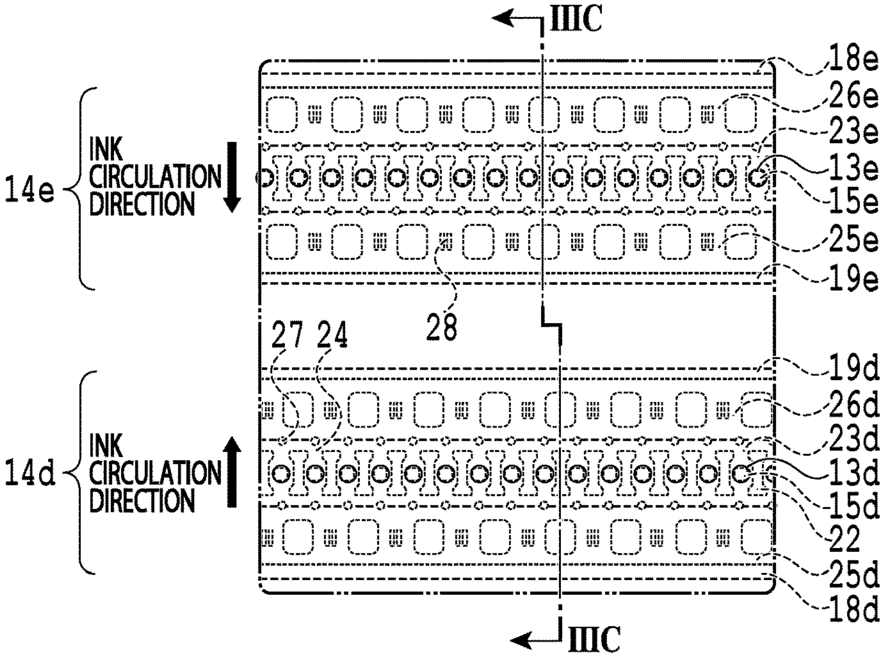
Figure 3C:
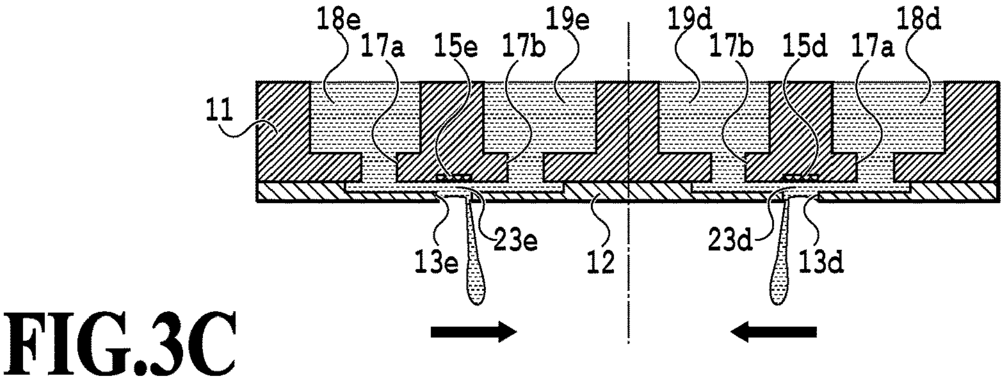

FIGS. 3A to 3C are diagrams illustrating the configuration of a print element substrate according to the first embodiment of the present disclosure, particularly illustrating the direction of circulation flow (liquid flow) for each ejection opening.

FIG. 3A is a diagram when viewed from the ejection opening formation member 12 side. The print element substrate 10 includes eight ejection opening arrays 14*a* to 14*h*, each two of which correspond to one of C, M, Y, and K inks. For example, the ejection openings of the ejection opening arrays 14*a* and 14*h* eject K ink, the ejection openings of the ejection opening arrays 14*b* and 14*g* eject Y ink, the ejection openings of the ejection opening arrays 14*c* and 14*f* eject M ink, and the ejection openings of the ejection opening arrays 14*d* and 14*e* eject C ink. The ejection openings 13 of one of the ejection opening arrays for each ink color are arrayed at intervals of 600 dpi, and the ejection openings 13 of the other ejection opening array 14 are disposed at positions shifted from the ejection openings 13 of the one ejection opening array by 1200 dpi in the ejection opening array direction. Accordingly, printing in each ink color can be performed with the corresponding two ejection opening arrays at the resolution of 1200 dpi in the ejection opening array direction.

As illustrated with black arrows in FIGS. 3A and 3B, the head unit 3 has a structure in which the direction of circulation flow of ink flowing through a pressure chamber for ejection openings is opposite between the pair of ejection opening arrays of each ink color. Specifically, the direction of ink circulation in the pressure chamber 23 of each of the ejection opening arrays 14*a* to 14*d* is from the lower side to the upper side in the diagrams, and the direction of ink circulation in the pressure chamber 23 in each of the ejection opening arrays 14*e* to 14*h* is from the upper side to the lower side in the diagrams. The term "circulation" in circulation flow is used in an aspect in which a liquid ejection apparatus of the present embodiment supplies liquid from a liquid holding unit such as one tank, collects liquid having passed through a pressure chamber of a head unit, and returns the liquid to the above-described tank as illustrated in FIG. 1B and the like. However, the present disclosure is not limited to this aspect, and liquid flow can be generated in a pressure chamber also in an aspect in which liquid is supplied from a liquid holding unit and liquid having passed through a pressure chamber of a head unit is collected by another liquid holding unit. Thus, liquid flow may be used as a term including these aspects.

FIG. 3B illustrates an enlarged view of part IIIb of the ejection opening arrays 14*d* and 14*e* in FIG. 3A. In the ejection opening array 14*d*, ink enters a supply-side common liquid chamber 25*d* through a supply port from a liquid supply path 18*d* on the lower side in FIG. 3B and is supplied to a pressure chamber 23*d* through a supply-side flow path. Then, the ink that is not ejected flows from a collection-side flow path to a collection-side common liquid chamber 26*d* and reaches a liquid collection path 19*d* through a collection port. In the ejection opening array 14*e*, circulation flow of ink in the pressure chamber 23*e* is generated from the upper side to the lower side in FIG. 3B through a path similar to that in the ejection opening array 14*d*.

Even with the configuration in which circulation flow is generated as described above, concentration distribution of a color material occurs to ink in an ejection opening 13 when ejection is performed from the ejection opening after ejection is stopped for a relatively long duration. FIG. 3C is a cross-sectional view of an ejection opening part, illustrating a section of an ejection opening part corresponding to the liquid supply paths 18*d* and 18*e*. As illustrated in FIG. 3C, the direction of ink circulation flow is opposite between the pressure chamber 23*d* and a pressure chamber 23*e*. As for ink concentration distribution in an ejection opening 13*d* and an ejection opening 13*e*, concentration is high in a large region on the upstream side of ink circulation flow and is low in a large region on the downstream side. In other words, in each ejection opening 13, the volume of high viscosity ink is large on the upstream side of ink circulation flow, and the volume of low viscosity ink is large on the downstream side. Due to this viscosity imbalance in each ejection opening 13, the ejection direction of an ejected droplet is imbalanced on the low viscosity side as illustrated in FIG. 3C. In the example illustrated in FIGS. 3A to 3C, the distance between each heater 15 and the corresponding ejection opening 13 is 22 μm, the thickness of the ejection opening formation member 12 that forms the ejection openings 13 is 6 μm, and the width of each pressure chamber 23 is 30 μm. With such a dimensional relation, ink circulation flow reaches near the surface of each ejection opening 13. Accordingly, the volume of high viscosity ink is large on the upstream side of ink circulation flow in each ejection opening 13. In a case of a dimensional relation with which ink circulation flow does not reach near each ejection opening 13, the volume of high viscosity ink is large on the downstream side of circulation flow, and the ejection direction of ejected ink is imbalanced in a direction opposite each direction illustrated in FIG. 3C. As described above, imbalance of the ink ejection direction occurs at initial ejection from each ejection opening after ejection is stopped for a relatively long duration.

In the example illustrated in FIGS. 3A to 3C, filters 27 are disposed in front of flow paths 24 in each pressure chamber 23 to prevent foreign objects from entering into the pressure chamber 23 during circulation. Thus, the filters 27 may be disposed only on the supply side. However, since ink refill is performed from the collection side during ejection, the filters are desirably disposed on the collection side as well as in the present embodiment. Each common liquid chamber on the supply side and the collection side has a relatively large area and tends to be weak in strength, and thus is desirably provided with pillars 28 at the middle for reinforcement. Moreover, disposition of ejection opening arrays for ink of the same color (liquid of the same kind) among the C, M, Y, and K inks is desirably line symmetric in the print element substrate 10. For example, the ejection opening arrays 14*a* and 14*h* are disposed for K, the ejection opening arrays 14*b* and 14*g* are disposed for Y, the ejection opening arrays 14*c* and 14*f* are disposed for M, and the ejection opening arrays 14*d* and 14*e* are disposed for C. With such disposition, in a case where printing is performed in an outward direction and an inward direction during scanning, the printing can be performed in the relation of the same color order and thus printing quality can be easily improved.

FIGS. 4A to 4D are diagrams for description of the above-described imbalance of the ink ejection direction at initial ejection and landing position shift due to the imbalance in terms of the relation between the direction of ink circulation in a pressure chamber and the scanning direction of the ejection head.

Figure 4A:
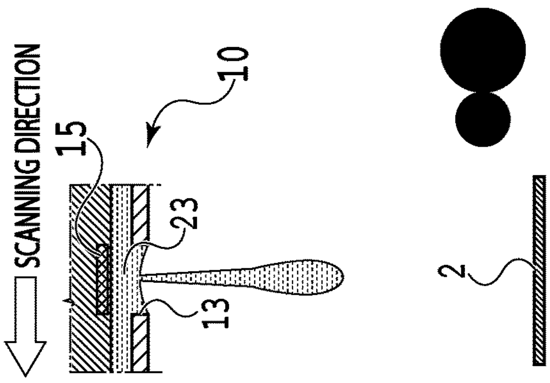
FIGS. 4A to 4D are diagrams for description of imbalance of an ink ejection direction at initial ejection and landing position shift due to the imbalance in terms of the relation between the direction of ink circulation in a pressure chamber and the scanning direction of an ejection head.
Figure 4B:
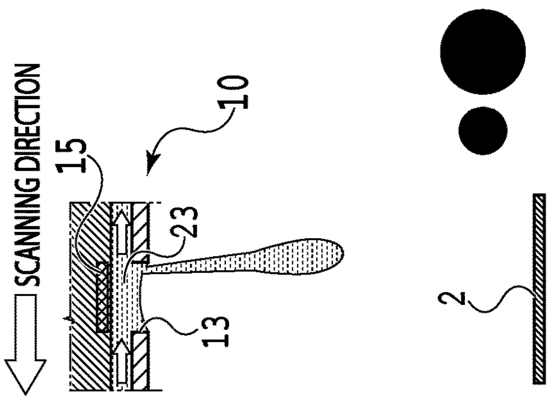
Figure 4C:
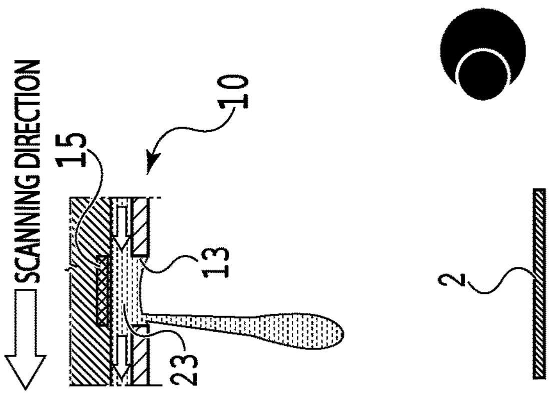

FIG. 4A illustrates normal ejection without influence of ejection stop for a long duration and the positions (shapes) of landing dots in the case. FIGS. 4B and 4C illustrate initial ejection after ejection stop and the positions (shapes) of landing dots in the case. In the examples illustrated in these diagrams, a main droplet and an elongated tail extending in connection on the back side of the main droplet are connected in ejected ink. The tail is often cut off the main droplet in flight due to the surface tension of liquid and the speed difference between the front and rear ends of a liquid column and becomes a minute droplet called a satellite. In a case where such a satellite is generated, the satellite sometimes lands at a position shifted from the main droplet on the printing medium depending on the size and ejection speed of the satellite, the scanning speed of the ejection head, the distance between an ejection opening and the printing medium, the influence of airflow along with ejection, and the like. In such a case in which the main droplet and the satellite separately land, a large dot due to the main droplet and a small dot due to the satellite are formed on the printing medium and constitute a pixel. The following description will be made with an example in which the main droplet and the satellite land at different positions, but application of the present disclosure is not limited to the example. For example, even in a case where ejected ink forms one dot without separating into the main droplet and the satellite, its landing position is sometimes different among ejection in FIGS. 4A to 4C. In particular, in a case where ink is ejected along with scanning by the ejection head as in the embodiment of the present disclosure, its landing position is affected by inertia along with scanning movement of the ejection head and varies in various manners in relation to landing position imbalance due to circulation flow to be described below. As a result, the aspect of density unevenness to be described below varies, and the present disclosure can be applied thereto.

FIG. 4B illustrates an ejection state and dot shapes in a case where the circulation direction of ink in a pressure chamber 23 is opposite the scanning direction of a liquid ejection head 10 relative to the printing medium 2 (first direction). FIG. 4C illustrates an ejection state and dot shapes in a case where the direction of ink circulation in a pressure chamber 23 is same as the scanning direction (second direction). In a case where the circulation direction is opposite the scanning direction as illustrated in FIG. 4B, the dot due to the main droplet and the dot due to the satellite are relatively separately formed. In a case where the circulation direction is the same as the scanning direction as illustrated in FIG. 4C, the dot due to the satellite is formed substantially inside the dot due to the main droplet.

Figure 4D:
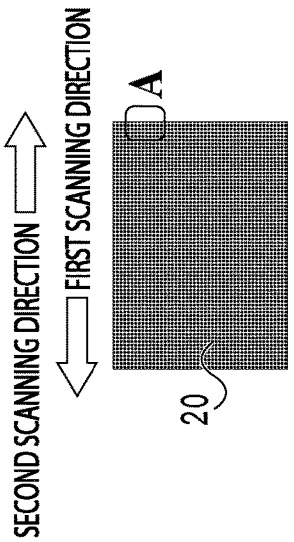

In a case where the above-described aspect of the landing position difference between the main droplet and the satellite of ejected ink is the same for an image 20 printing of which is completed through scanning by the ejection head illustrated in FIG. 4D, density is, for example, low at an end part of the image 20, which includes part A, and recognized as density unevenness of the image 20 in some cases.

Figures 5A, 5B, 5C:
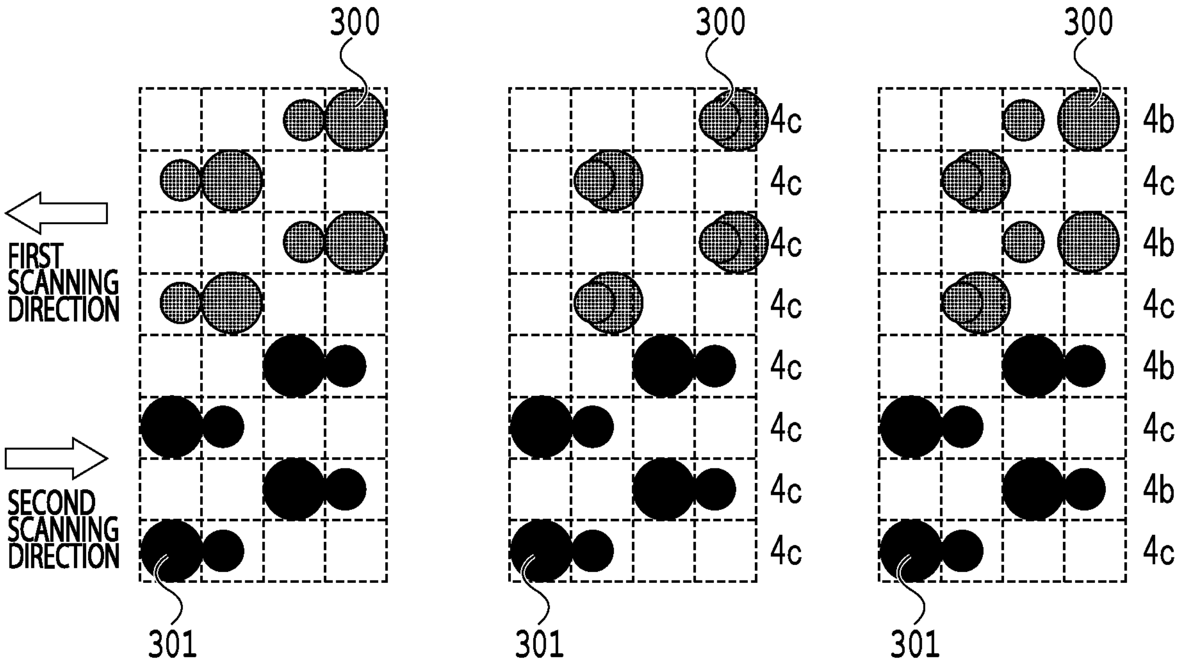
FIGS. 5A to 5E are diagrams for description of generation of density unevenness and a printing aspect of an embodiment for reducing the density unevenness.
Figures 5D, 5E:
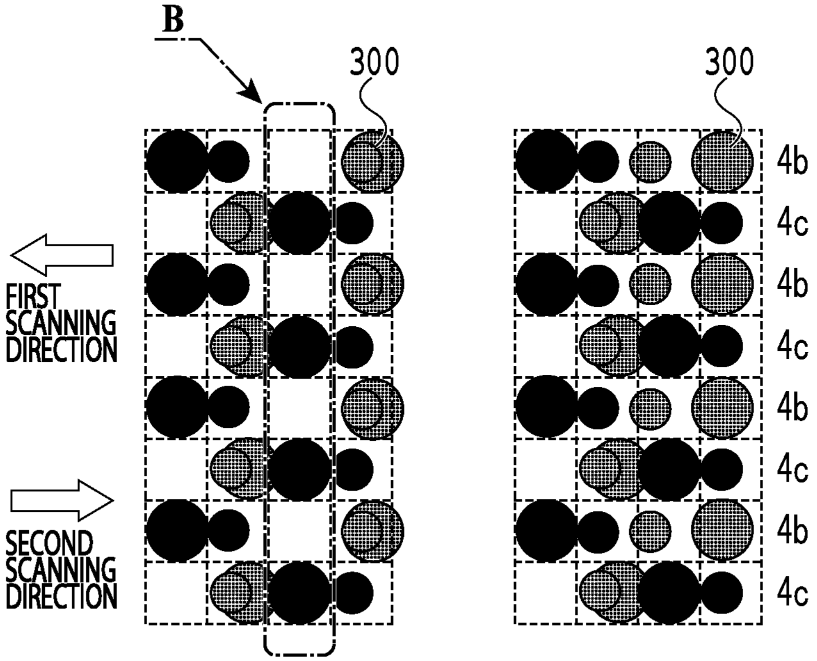

FIGS. 5A to 5E are diagrams for description of the above-described generation of density unevenness and a printing aspect of the present embodiment for reducing the density unevenness. These diagrams are enlarged views of part A of the printed image 20 illustrated in FIG. 4D, illustrating the printed image with dots formed by ink landing at each pixel. In each diagram, one square represents the size of 1200 dpi, and in the longitudinal direction of the diagram (direction in which ejection openings are arrayed), dots are formed at a pixel of 1200 dpi, which is the same as the array density of ejection openings, by ejected ink from an ejection opening corresponding to the pixel. In the lateral direction of the diagram (scanning direction), dots are formed at a pixel of 300 dpi (four squares in the lateral direction) with ink ejected from the corresponding ejection opening along with scanning. Thus, two pairs of dots of the main droplet and the satellite formed in four squares in the lateral direction in FIGS. 5D and 5E are formed at the same pixel. Thus, FIGS. 5A to 5C correspond to a duty that one pixel is printed though a single time of ejection, and FIGS. 5D and 5E correspond to a duty that one pixel is printed through two times of ejection. Dots illustrated with hatched circles are formed by scanning in a first scanning direction (direction from the right to the left in the diagram) illustrated in FIG. 4D, and dots illustrated with black circles are formed by scanning in a second scanning direction (direction from the left to the right in the diagram) illustrated in FIG. 4D. Specifically, FIGS. 5A to 5C each illustrate a case in which the upper four pixels in the longitudinal direction are printed by first scanning and the lower four pixels are printed by second scanning in the opposite direction, and in this case, ejection openings used for dot formation in the second scanning are ejection openings used for dot formation in the previous first scanning. This is possible, for example, by performing, after the first scanning, printing medium conveyance in an amount corresponding to ejection openings used for printing in a first scanning region, and by performing printing in a second scanning region by using the ejection openings.

FIG. 5A illustrates dots formed by normal ejection illustrated in FIG. 4A. As illustrated in FIG. 5A, in the normal ejection, no imbalance of the ejection direction occurs irrespective of the relation between the circulation flow direction and the scanning direction, and the dots due to the main droplet and the satellite are formed partially overlapping each other in the example illustrated in the diagram.

FIGS. 5B to 5E illustrate dot formation when imbalance of the ejection direction occurs at initial ejection after stop. FIGS. 5B and 5C correspond to cases where a single time of scanning is performed for a unit region in which printing is completed, and FIGS. 5D and 5E correspond to cases where two times of scanning are performed for the unit region. FIGS. 5B and 5D correspond to cases where printing is performed by using only ejection openings for which the direction of ink circulation is the same as the scanning direction. FIGS. 5C and 5E correspond to cases according to the present embodiment where printing is performed by using ejection openings for which the direction of ink circulation is the same as the scanning direction and ejection openings for which the direction of ink circulation is opposite the scanning direction.

In a case where printing is completed for a unit region through a single time of scanning, dots 300 (FIG. 4C) are formed by performing printing only with ejection openings (4*c*) for which the direction of ink circulation is the same as the scanning direction as illustrated in FIG. 5B. Specifically, in the dots 300 (FIG. 4C), landing dots of the main droplet and the satellite overlap each other in a large part because of imbalance of the ejection direction due to initial ejection in the first scanning. As a result, area by which each formed dot occupies a pixel (four squares in the lateral direction) is smaller than for the normal ejection (FIG. 5A), and density is low at this part in the entire image 20. In the second scanning illustrated in FIG. 5B, printing is performed with ejection openings used in the first scanning, and thus ejection stop of a relatively long period does not occur between the first scanning and the second scanning, and accordingly, normal landing dots are formed.

However, in the present embodiment, printing is performed by using the ejection head (FIGS. 3A to 3C) including an array of ejection openings for which the direction of ink circulation in the corresponding pressure chamber 23 is the same as the scanning direction and ejection openings for which the direction of ink circulation in the corresponding pressure chamber 23 is opposite the scanning direction. As illustrated in FIG. 5C, pixels on the first, third, fifth, and seventh rows from above in the pixel array are printed with ejection openings (4*b*) for which the direction of ink circulation is opposite the scanning direction, and pixels on the second, fourth, sixth, and eighth rows from above in the pixel array are printed with ejection openings (4*c*) for which the direction of ink circulation is the same as the scanning direction. Accordingly, through initial ejection in the first scanning, dots 300 (FIG. 4B) in which the dots due to the main droplet and the satellite are separated from each other are formed at the pixels on the first and third rows. As a result, the pixels on these rows are occupied by dots with relatively large area, and thus density decrease is reduced as compared to the case of the normal ejection illustrated in FIG. 5A, and density unevenness of the entire image 20 is reduced. Similarly, in a case where printing is completed for a unit region through two times of scanning, dots with large overlapping parts as illustrated in FIG. 5D are formed in the first scanning by performing printing only with ejection openings (4*c*) for which the direction of ink circulation is the same as the scanning direction. Specifically, hatched dots 300 (FIG. 4C) in which landing dots of the main droplet and the satellite overlap each other in a large part because of imbalance of the ejection direction due to initial ejection are formed. As a result, area by which each formed dot occupies a pixel (four squares in the lateral direction) is smaller than for the normal ejection (FIG. 5A). In the second scanning in the opposite direction, normal ejection (FIG. 4A) is performed since ejection in the first scanning is performed with all ejection openings. As a result, density is low in region B in FIG. 5D, in particular, and density unevenness occurs at this part in the entire image 20.

However, in the present embodiment, at initial ejection in the first scanning, dots 300 (FIG. 4B) in which the dots due to the main droplet and the satellite are separated from each other are formed at the pixels on the first, third, fifth, and seventh rows as illustrated in FIG. 5E. As a result, the pixels on these rows are occupied by dots with relatively large area, and thus concentration decrease is reduced as compared to the case of the normal ejection illustrated in FIG. 5A, and density unevenness of the entire image 20 is reduced.

In the above-described embodiment, in liquid ejection control of the printing aspect described with reference to FIGS. 5B and 5C, the ejection head unit 10 is prepared, the printing medium is conveyed by an amount corresponding to ejection opening arrays used for printing in outward scanning, and printing in inward scanning is performed with the same ejection opening arrays used in the outward scanning. In the printing aspect illustrated in FIGS. 5D and 5E, printing is performed with the same ejection opening array without conveying the printing medium during reciprocate scanning of the ejection head 10. The present invention is not limited to these printing aspects but is also applicable to any other printing aspect that involves scanning of the ejection head.

Figure 6A:
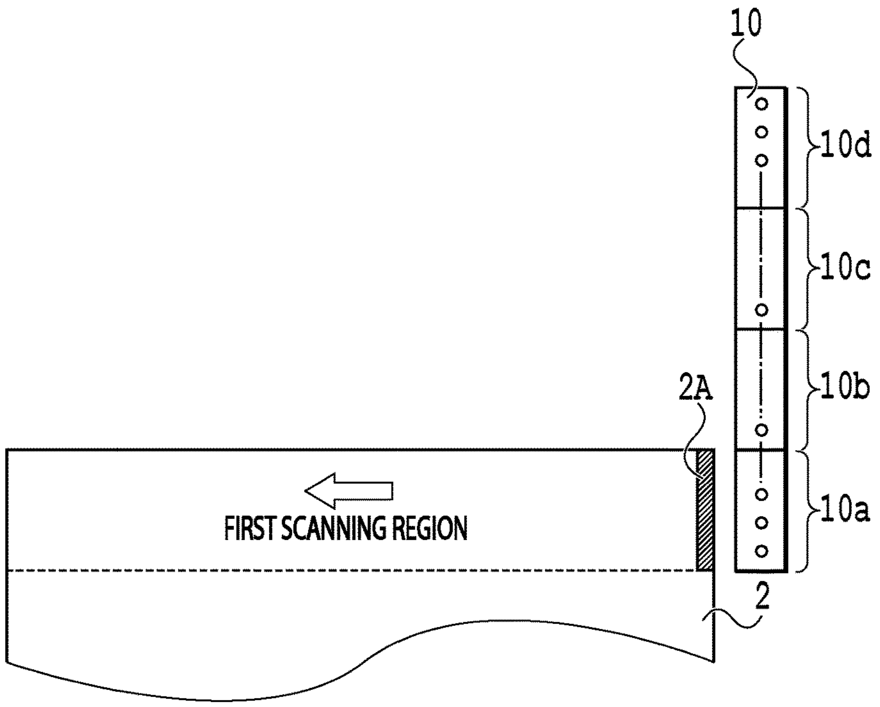
FIGS. 6A and 6B are diagrams for description of a printing aspect according to another embodiment.
Figure 6B:
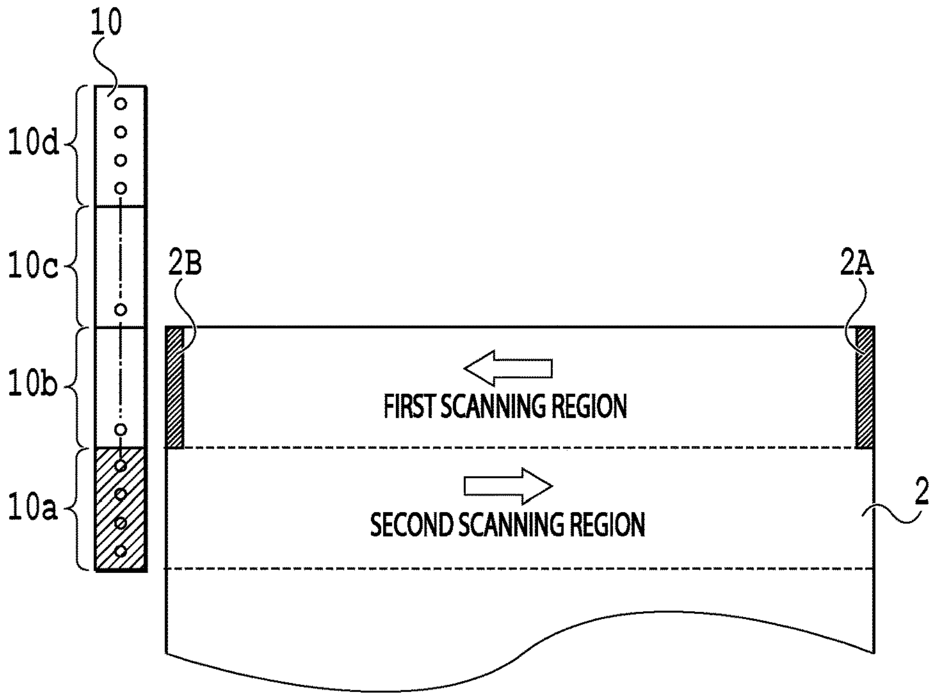

FIGS. 6A and 6B are diagrams for description of an example of another printing aspect, illustrating a printing aspect in which the ejection opening arrays of the ejection head are divided into ranges of ejection openings and the printing medium is conveyed by an amount corresponding to each range during scanning.

In the first scanning of this printing, as illustrated in FIG. 6A, the ejection opening arrays of the ejection head 10 are divided into four ranges of ejection opening groups 10*a* to 10*d*, and printing is performed by scanning a first scanning region of the printing medium 2 with the ejection opening group 10*a*. In a case where the ejection opening group 10*a* has been stopped for a long period, density unevenness can occur at a scanning start end part 2A of the scanning region. However, in the ejection head 10 according to the present embodiment, ejection openings for which the scanning direction is the same as and opposite the direction of ink circulation are arrayed for the first scanning region as described above, and thus density unevenness at the scanning start end part 2A is reduced. Subsequently in the second scanning in a direction opposite the direction of the first scanning, as illustrated in FIG. 6B, printing is performed by scanning the first and second scanning regions of the printing medium 2 with the ejection opening groups 10*a* and 10*b* of the ejection head 10. In a case where the ejection opening group 10*b* has been stopped for a long period although ejection from the ejection opening group 10*a* is performed in the first scanning, density unevenness can occur at a scanning start end part 2B of the scanning region. However, in this case as well, similarly to the case of the end part 2A, density unevenness at the scanning start end part 2B is reduced with the ejection head 10 according to the present embodiment. Subsequently, printing medium conveyance by an amount corresponding to each of the ejection opening groups of the four divided ranges and scanning of the k-th scanning region with the ejection opening group are alternately repeated in the same manner, and accordingly, an image or the like can be printed on the printing medium 2.

In the above-described printing aspect with reference to FIGS. 6A and 6B, printing of a unit region (the first scanning region and the second scanning region) corresponding to the width of the ejection opening groups is completed through a plurality of times (four times in the example illustrated in the diagrams) of scanning. According to the printing aspect, it is possible to reduce density unevenness attributable to variance in ejection characteristics of the ejection openings in the ejection opening arrays of the ejection head. Thus, with this printing aspect, it is possible to more effectively reduce density unevenness due to landing position difference at initial ejection in the present disclosure.

Although the above description is made with examples of reciprocate scanning, the above-described printing aspects are also applicable to scanning in one direction.

Typically, the influence of thickened ink at ejection openings after stop for a long period is not resolved through a single shot of ejection but is gradually recovered through several shots of ejection. Thus, it is possible to reduce density unevenness after stop for a long period by forming dots corresponding to the above-described several shots by using an ejection head including an array of ejection openings for which the direction of ink circulation is the same as and opposite the scanning direction as in the present embodiment.

Second Embodiment

Figure 7A:
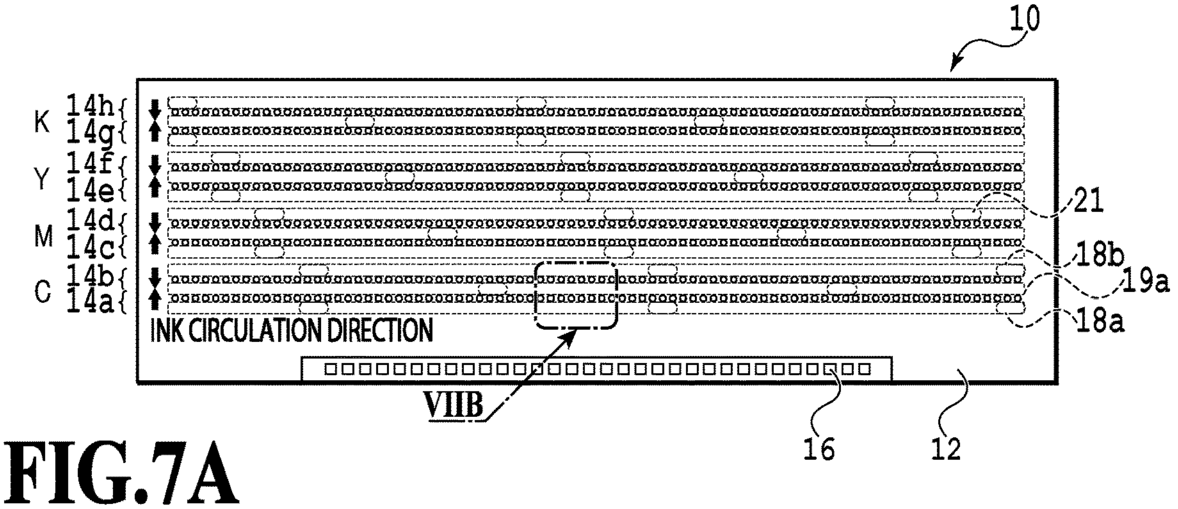
FIGS. 7A to 7C are diagrams illustrating the configuration of a print element substrate according to a second embodiment of the present disclosure.
Figure 7B:
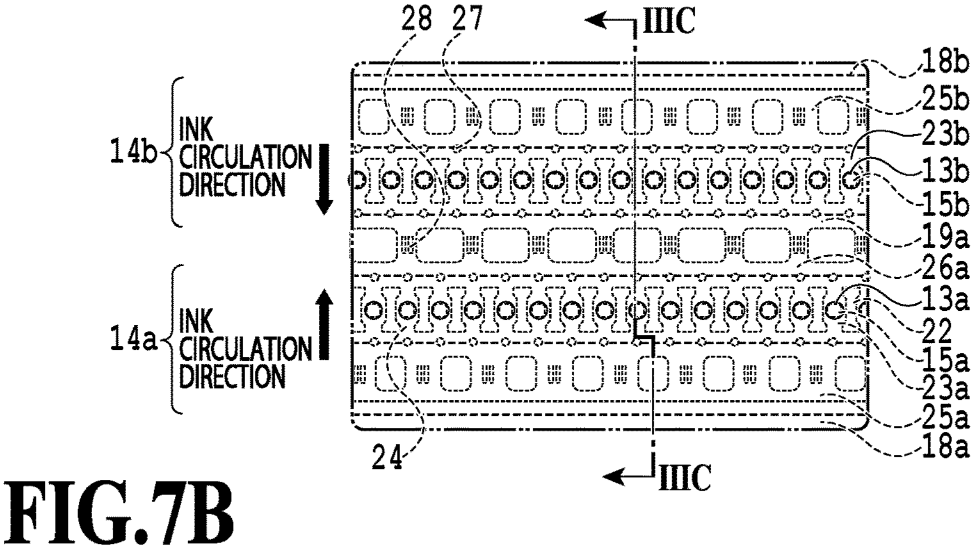
Figure 7C:
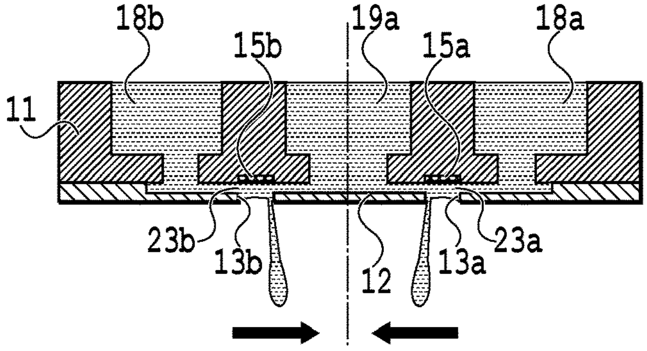

FIGS. 7A to 7C are diagrams illustrating the configuration of a print element substrate according to the second embodiment of the present disclosure and are similar to FIGS. 3A to 3C.

FIG. 7A is a diagram when viewed from the ejection opening formation member 12 side. The direction of ink circulation in the pressure chamber 23 of each of the ejection opening arrays 14*a*, 14*c*, 14*e*, and 14*g* is from the lower side to the upper side in the diagram, and the direction of ink circulation in the pressure chamber 23 of each of the ejection opening arrays 14*b*, 14*d*, 14*f*, and 14*h* is from the upper side to the lower side in the diagram. In the present embodiment, two ejection opening arrays for each of C, M, Y, and K inks are adjacent to each other. For example, the ejection opening arrays 14*a* and 14*b* are disposed for C, the ejection opening arrays 14*c* and 14*d* are disposed for M, the ejection opening arrays 14*e* and 14*f* are disposed for Y, and the ejection opening arrays 14*g* and 14*h* are disposed for K. In this manner, the ejection opening arrays 14 of each color are disposed adjacent to each other in a pair. The directions of ink circulation in the pressure chambers 23 for each color are opposite to each other.

FIG. 7B illustrates an enlarged view of part VIIb of the ejection opening arrays 14*a* and 14*b* in FIG. 7A. In the present embodiment, the two ejection opening arrays each include various structures on the liquid supply side but share various structures on the collection side, which is difference from the configuration according to the first embodiment illustrated in FIGS. 3A, 3B, and 3C. As illustrated in FIG. 7B, in the ejection opening array 14*a*, ink enters a supply-side common liquid chamber 25*a* through a supply port from a liquid supply path 18*a* on the lower side in the diagram and is supplied to a pressure chamber 23*a* through a supply-side flow path. Then, the ink that is not ejected flows from a collection-side flow path to a collection-side common liquid chamber 26*a* and reaches a liquid collection path 19*a* through a collection port. In the ejection opening array 14*b*, ink flows from the upper side to the lower side in the diagram, enters a supply-side common liquid chamber 25*b* through a supply port from a liquid supply path 18*b*, and is supplied to a pressure chamber 23*b* through a supply-side flow path. Then, the ink that is not ejected flows from a collection-side flow path to the collection-side common liquid chamber 26*a*, which is the same for the ejection opening array 14*a*, and reaches the liquid collection path 19*a* through a collection port.

Since various structures on the collection side are shared in this manner, one liquid collection path 19 can be omitted for each two ejection opening arrays, and thus it is possible to downsize the print element substrate 10 including the same number of ejection opening arrays. Moreover, since ejection opening arrays of the same color, between which the circulation direction is opposite, are adjacent to each other, it is easier to improve landing accuracy between the arrays of the same color.

Third Embodiment

Figure 8A:
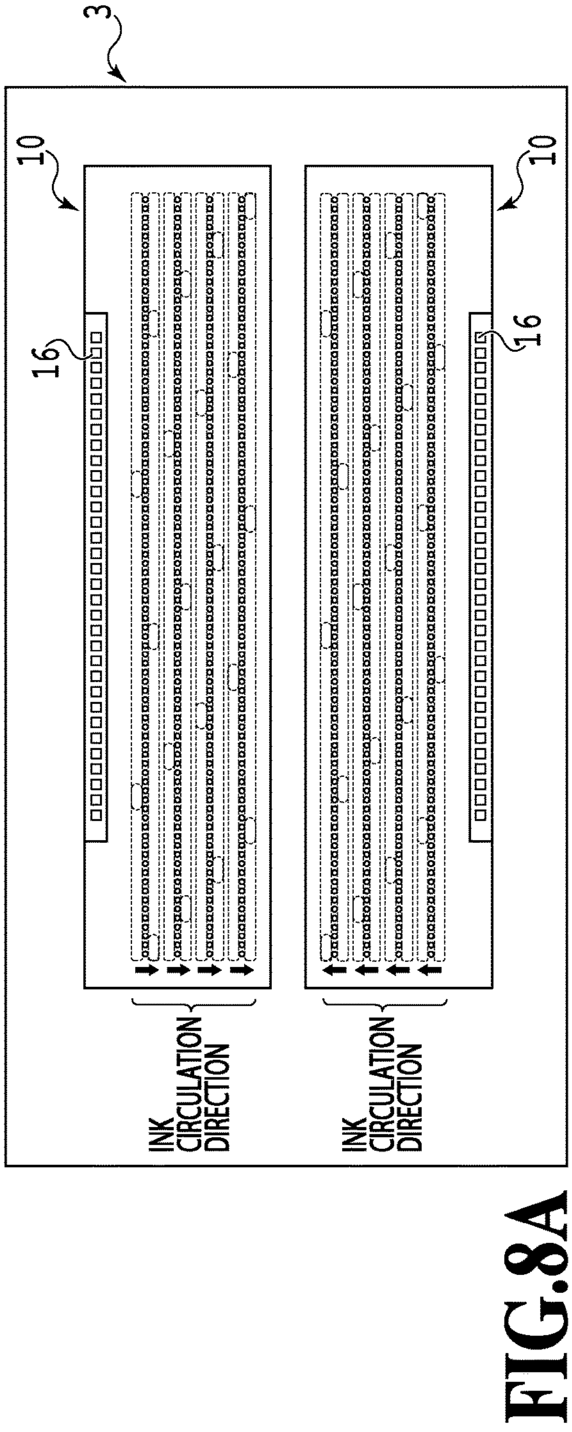
FIGS. 8A and 8B are diagrams illustrating the configuration of a head unit according to a third embodiment of the present disclosure.
Figure 8B:
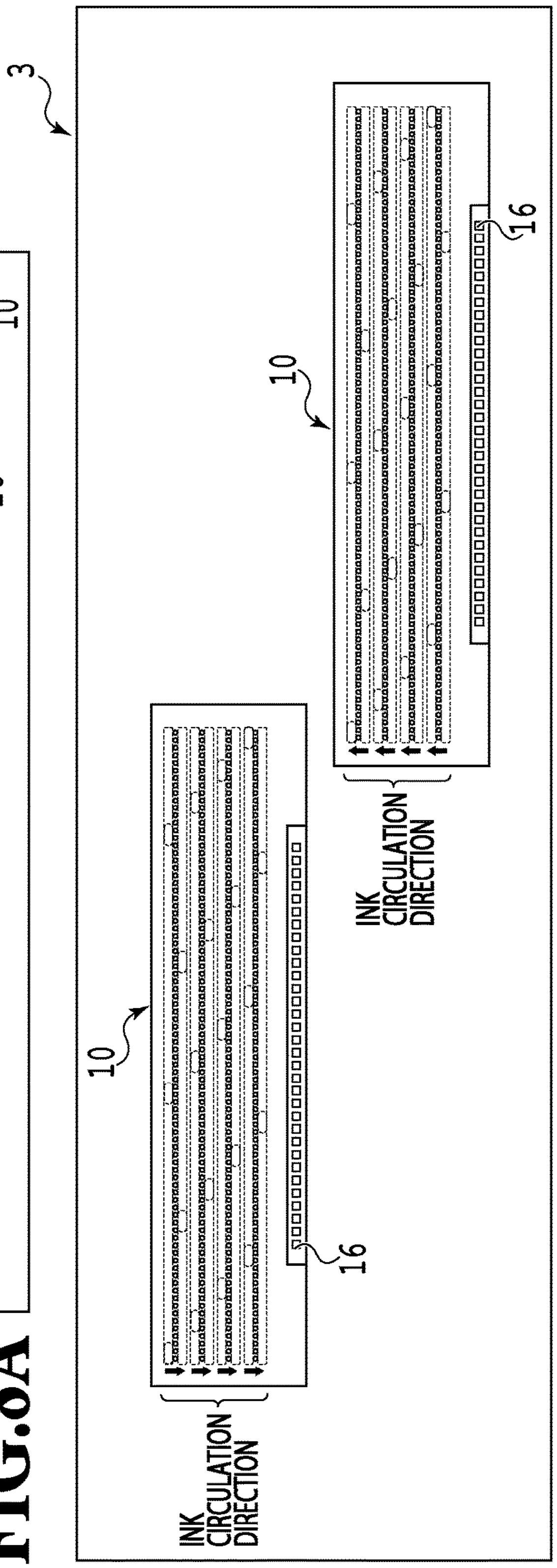

FIGS. 8A and 8B are diagrams illustrating the configuration of a head unit according to the third embodiment of the present disclosure. In the third embodiment, the head unit 3 includes two print element substrates (ejection heads) 10, and the direction of ink circulation in the pressure chamber 23 is opposite between the first print element substrate and the second print element substrate.

FIG. 8A is a diagram of an exemplary structure of the head unit 3 of the present embodiment when viewed from a surface at which the ejection openings 13 are provided. In FIGS. 8A and 8B, illustrations of flexible wiring substrates, electric substrates, electric sealing parts, and the like are omitted for simplification of description. The terminals 16 of each print element substrate 10 are formed in the longitudinal direction at one end part of the print element substrate 10 in the transverse direction and electrically connected to a flexible wiring substrate through gold wires or the like. If the print element substrates 10 are disposed in the same direction, the gap between the print element substrate 10 needs to be large enough to obtain a space in which flexible wiring substrates are disposed. As described above for the second embodiment, it is easier to improve landing accuracy when ejection opening arrays 14 are close to each other, and thus the print element substrates 10 are desirably disposed close to each other. Accordingly, the two print element substrates 10 are rotated from each other by 180° and disposed point symmetric as illustrated in FIG. 8A. In this disposition, the terminals 16 do not face the counterpart print element substrate 10, and thus it is possible to shorten the distance between the print element substrates 10 while obtaining a space in which flexible wiring substrates are disposed.

In a case of the configuration as illustrated in FIG. 8A, the ejection opening arrays 14 of C, M, Y, and K ink are desirably disposed line symmetric for ink of the same color in the entire head unit 3. With such disposition, in a case where printing is performed in an outward direction and an inward direction during scanning, the printing can be performed in the same relation and thus printing quality can be easily improved.

FIG. 8B relates to another example and illustrates a configuration in which the print element substrates 10 are disposed in a staggered manner to increase the length of printing by the ejection head unit 3. In this configuration, the direction of ink circulation in the pressure chamber 23 is opposite between the print element substrates 10. As described above with reference to FIGS. 6A and 6B, after printing is performed with one of the print element substrates 10, scanning and printing are performed in the same unit region with the other print element substrate 10. Although the two print element substrates 10 are disposed in a staggered manner in the same orientation in FIG. 8B, the two print element substrates are desirably disposed point symmetric as illustrated in FIG. 8A. This is because, in a case where the numbers and disposition of openings on the supply side and openings on the collection side in each print element substrate 10 are different, density unevenness due to temperature in accordance with the positions thereof and density unevenness due to pressure drop through the liquid supply paths 18 and the liquid collection paths 19 potentially occur at different positions and become difficult to correct.

Other Embodiments

In the structure of the ejection head described above in the embodiments, the direction of ink circulation is different for each ejection opening in the ejection opening array direction such that the direction of ink circulation is the same as and opposite the scanning direction, but application of the present invention is not limited to this aspect. For example, the direction of ink circulation may be different for each set of a plurality of ejection openings such as two or three ejection openings in the ejection opening array direction. Moreover, the ranges of ejection openings between which the direction of ink circulation is different may be randomly determined. In other words, the ranges of ejection openings between which the direction of ink circulation is different may be determined in accordance with the number of ejection openings constituting ejection opening arrays and the above-described printing aspects so that density unevenness attributable to initial ejection after stop for a long period can be more effectively reduced.

In the above-described embodiments, the direction of ink circulation is opposite for each ink color, but in addition, the direction of ink circulation may be opposite between different ink colors. In this case, the direction of ink circulation is preferably different between, for example, ejection opening arrays of ink C and ink M from a viewpoint of color density. In a case where this configuration is applied to the example illustrated in FIG. 3A, for example, the direction of ink circulation in the ejection opening arrays 14*c* and 14*f* of ink M is opposite the arrows illustrated in the diagram, and thus is opposite the direction of ink circulation in the ejection opening arrays 14*d* and 14*e* of ink C.

According to the above-described embodiments, density unevenness of initial ejection from ejection openings of a liquid ejection apparatus after ejection stop can be reduced in a region in which printing is performed by relative movement of an ejection head.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-195900 filed Dec. 7, 2022, which is hereby incorporated by reference herein in its entirety.

What is claimed is:

1. A liquid ejection apparatus comprising:

an ejection head including (1) a plurality of ejection openings, (2) a plurality of pressure chambers corresponding to the respective ejection openings and communicating with the corresponding ejection openings, (3) a pair of flow paths communicating with each of the pressure chambers, (4) a supply port communicating with one of the pair of flow paths and supplying liquid to the plurality of pressure chambers, and (5) a collection port communicating with the other of the pair of flow paths and collecting liquid from the plurality of pressure chambers;

a generation unit configured to generate liquid flow that passes through each of the pressure chambers via the pair of flow paths and to differentiate, for each of the corresponding ejection openings, a first direction of liquid flow passing through one of the corresponding pressure chambers and a second direction of liquid flow passing through another of the corresponding pressure chambers which is opposite the first direction of liquid flow;

a scanning unit configured to scan the ejection head in the first direction and the second direction; and a control unit configured to perform printing by causing the scanning unit to scan the ejection head relative to a printing medium and ejecting liquid from the ejection openings corresponding to the pressure chambers of the first direction of liquid flow and from the ejection openings corresponding to the pressure chambers of the second direction of liquid flow to a unit region in which printing is to be completed on the printing medium.

2. The liquid ejection apparatus according to claim 1, wherein, in arrays of the ejection openings, an ejection opening corresponding to a pressure chamber of the first direction of liquid flow and an ejection opening corresponding to a pressure chamber of the second direction of liquid flow are alternately arrayed.

3. The liquid ejection apparatus according to claim 1, wherein the ejection head performs ejection in which liquid ejected from the ejection openings is separated into a main droplet and a satellite in flight.

4. The liquid ejection apparatus according to claim 1, wherein, in the ejection head, an ejection opening corresponding to a pressure chamber of the first direction of liquid flow and an ejection opening corresponding to a pressure chamber of the second direction of liquid flow belong to different ejection opening arrays.

5. The liquid ejection apparatus according to claim 1, wherein, in the ejection head, an ejection opening corresponding to a pressure chamber of the first direction of liquid flow and an ejection opening corresponding to a pressure chamber of the second direction of liquid flow belong to adjacent ejection opening arrays.

6. The liquid ejection apparatus according to claim 1, wherein, in the ejection head, an ejection opening corresponding to a pressure chamber of the first direction of liquid flow and an ejection opening corresponding to a pressure chamber of the second direction of liquid flow are provided at different print element substrates.

7. The liquid ejection apparatus according to claim 1, wherein the ejection head ejects liquid of the same kind from an ejection opening corresponding to a pressure chamber of the first direction of liquid flow and from an ejection opening corresponding to a pressure chamber of the second direction of liquid flow.

8. The liquid ejection apparatus according to claim 1, wherein, in the ejection head, an ejection opening array of ejection openings corresponding to pressure chambers of the first direction of liquid flow and an ejection opening array of ejection openings corresponding to pressure chambers of the second direction of liquid flow, from which liquid of the same kind is ejected, are disposed line symmetric.

9. The liquid ejection apparatus according to claim 1, wherein the control unit performs printing by scanning the ejection head in a reciprocating manner and ejecting liquid to the unit region from the ejection openings corresponding to the pressure chambers of the first direction of liquid flow and the ejection openings corresponding to the pressure chambers of the second direction of liquid flow.

10. The liquid ejection apparatus according to claim 1, wherein the control unit performs printing by scanning the ejection head in a reciprocating manner, conveying a printing medium by an amount corresponding to the unit region during the scanning the ejection head in the reciprocating manner, and ejecting liquid to the unit region from the ejection openings corresponding to the pressure chambers of the first direction of liquid flow and from the ejection openings corresponding to the pressure chambers of the second direction of liquid flow.

11. A liquid ejection control method comprising:

preparing an ejection head including (1) a plurality of ejection openings, (2) a plurality of pressure chambers corresponding to the respective ejection openings and communicating with the corresponding ejection openings, (3) a pair of flow paths communicating with each of the pressure chambers, (4) a supply port communicating with one of the pair of flow paths and supplying liquid to the plurality of pressure chambers, and (5) a collection port communicating with the other of the pair of flow paths and collecting liquid from the plurality of pressure chambers;

generating liquid flow that passes through each of the pressure chambers via the pair of flow paths, and differentiating, for each of the ejection openings, a first direction of liquid flow passing through one of the corresponding pressure chambers and a second direction of liquid flow passing through another of the corresponding pressure chambers which is opposite the first direction of liquid flow;

scanning the ejection head in the first direction and the second direction; and performing printing by scanning the ejection head relative to a printing medium in the scanning and ejecting liquid from the ejection openings corresponding to the pressure chambers of the first direction of liquid flow and from the ejection openings corresponding to the pressure chambers of the second direction of liquid flow to a unit region in which printing is to be completed on the printing medium.

* * * * *